(12) United States Patent
Abate

(10) Patent No.: US 8,445,084 B2
(45) Date of Patent: May 21, 2013

(54) ONE-WAY GLASS ARTICLE

(76) Inventor: Matthew C. Abate, Mountain Lakes, NJ (US)

( * ) Notice: Subject to any disclaimer, the term of this patent is extended or adjusted under 35 U.S.C. 154(b) by 120 days.

(21) Appl. No.: 12/924,376

(22) Filed: Sep. 27, 2010

(65) Prior Publication Data
US 2011/0129626 A1  Jun. 2, 2011

Related U.S. Application Data

(63) Continuation-in-part of application No. 29/348,117, filed on Nov. 30, 2009, now Pat. No. Des. 643,969, and a continuation-in-part of application No. 29/348,118, filed on Nov. 30, 2009, now Pat. No. Des. 643,569.

(51) Int. Cl.
B32B 1/00 (2006.01)

(52) U.S. Cl.
USPC .......................... 428/34.4; 428/34.1; 428/34.6

(58) Field of Classification Search
USPC ..................... 428/34.1, 34.4, 34.6, 34.7, 35.7, 428/36.4, 36.9, 36.91, 36.92
See application file for complete search history.

(56) References Cited

U.S. PATENT DOCUMENTS

| | | | |
|---|---|---|---|
| 41,547 A | 2/1864 | Stratton | |
| D30,089 S | 1/1899 | Zuck | |
| 1,106,135 A | 8/1914 | Dawes | |
| 2,271,836 A | 2/1942 | Francis | |
| 2,286,247 A | 6/1942 | Yearta | |
| 2,339,385 A | 1/1944 | Dupler | |
| 2,871,343 A | 1/1959 | Whitney | |
| 3,336,474 A | 8/1967 | Leibl | |
| 3,379,872 A | 4/1968 | Devine, Jr. | |
| 3,477,142 A * | 11/1969 | Cornell et al. | 434/335 |
| D217,197 S | 4/1970 | Phillips | |
| D217,975 S | 7/1970 | Pruett | |
| 3,593,020 A | 7/1971 | Donato | |
| D221,585 S | 8/1971 | Moore | |
| 3,610,918 A | 10/1971 | Barlow | |
| 3,706,299 A * | 12/1972 | Hendges | 119/258 |
| D236,651 S | 9/1975 | Park | |
| 3,937,948 A | 2/1976 | Allison | |
| 4,121,279 A | 10/1978 | Whitesel | |
| 4,139,955 A | 2/1979 | Reiback | |
| D251,416 S | 3/1979 | Kovach | |
| RE30,103 E | 9/1979 | Spector | |
| 4,420,798 A | 12/1983 | Herst et al. | |
| D275,626 S | 9/1984 | Moore | |
| 4,553,680 A | 11/1985 | Griggs et al. | |
| D295,715 S | 5/1988 | Garrett | |
| 4,754,380 A | 6/1988 | Wang | |
| D328,503 S | 8/1992 | Masahara | |
| D329,301 S | 9/1992 | Leonard | |
| 5,262,929 A * | 11/1993 | Lenhart | 362/161 |
| 5,297,012 A | 3/1994 | Fletcher | |
| D381,135 S | 7/1997 | Hochlan, Jr. | |
| 5,676,446 A | 10/1997 | Gold | |
| D389,267 S | 1/1998 | Sutton et al. | |
| 5,788,579 A | 8/1998 | Cherry et al. | |
| D419,961 S | 2/2000 | Weatherill | |
| D449,525 S | 10/2001 | Sturgess | |
| D451,684 S | 12/2001 | Vincent | |

(Continued)

Primary Examiner — Walter B Aughenbaugh

(57) ABSTRACT

An article made of one-way glass is disclosed. The reflective surface of the one-way glass faces inwardly of the article. The article is free of internal or external ornamentation or opaque elements and is illuminated by external light sources reflected within the article by the reflective surface.

9 Claims, 2 Drawing Sheets

U.S. PATENT DOCUMENTS

| | | |
|---|---|---|
| D466,804 S | 12/2002 | Solland |
| D472,009 S | 3/2003 | Eisenberg |
| 6,644,834 B2 | 11/2003 | Christen |
| D507,307 S | 7/2005 | Austin |
| D518,587 S | 4/2006 | Rodriguez, Jr. |
| D539,971 S | 4/2007 | McDowell |
| D543,450 S | 5/2007 | Watzig et al. |
| D551,969 S | 10/2007 | Aurilio et al. |
| D556,361 S | 11/2007 | Arbel |
| D600,547 S | 9/2009 | Cain |
| 2002/0085392 A1 | 7/2002 | Hajianpour |
| 2004/0094437 A1 | 5/2004 | Dailey, III |
| 2006/0093979 A1* | 5/2006 | Varanasi et al. ............. 431/291 |

\* cited by examiner

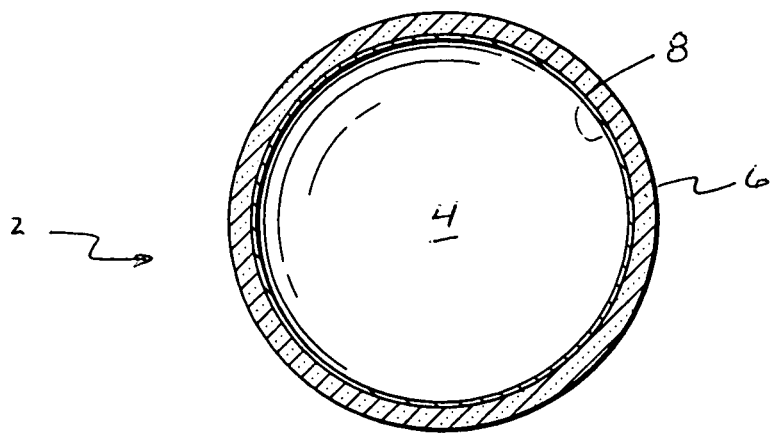
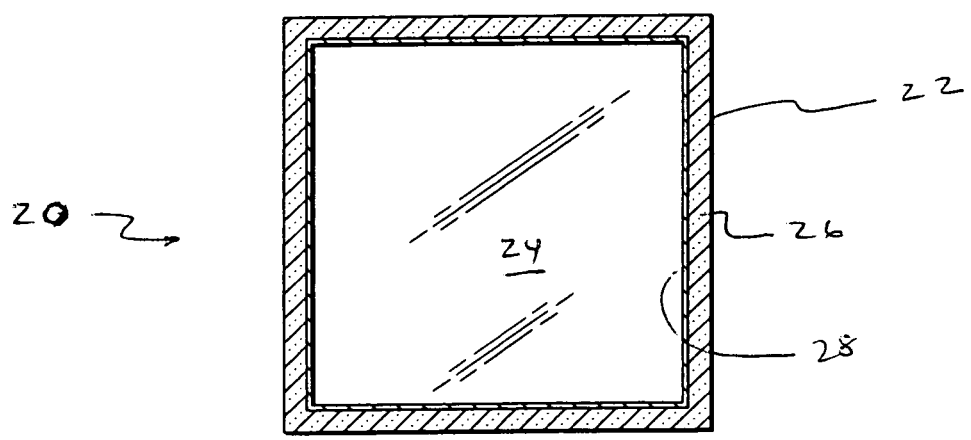

ONE-WAY GLASS ARTICLE

RELATED PATENTS AND PRIORITY CLAIM

This application is a continuation-in-part of design applications 29/348,117 and 29/348,118, filed on Nov. 30, 2009, now U.S. Pat. Nos. D643,969 and D643,569, respectively, which are hereby incorporated by reference.

BACKGROUND OF THE INVENTION

1. Technical Field

The invention generally relates to articles made of transparent materials, such as glass, and in particular having a one-way glass reflective surface.

2. Description of Related Art

Related art includes U.S. Pat. No. 2,339,385 to Dupler and U.S. Pat. No. 3,610,918 to Barlow.

Dupler shows a globe lamp having an opening for receiving an internal light source. There are a number of features internal and external to the globe lamp associated with the opening. For example, attached to the opening is an opaque flange 14 that extends to the external surface of the globe. Further, Dupler provides for an opaque tubular mounting sleeve 12 projecting inside the globe having an annular portion 13 and tapered ribs 15 and a flat, non-spherical portion of the globe to allow for mounting the globe on a pedestal.

Barlow shows a novelty light device having planar panels 12 held together by opaque support ribs 14 to form a cube. Barlow provides for an internal light source and opaque internal elements comprised of miniature bulbs 16, support wires for the bulbs 18, and electric wires 20; a pedestal base 10 and 32; and an electrical connector 40 to allow for rotation of the cube.

A number of other prior art references disclose articles of a variety of shapes and made from a variety of materials and some including one-way glass reflective surfaces, such as:

D30,089 to Zuck
D41,547 to Stratton
D217,197 to Phillips
D217,975 to Pruett
D221,585 to Moore
D236,651 to Park
D251,416 to Kovach
D275,626 to Moore
D295,715 to Garrett
D328,503 to Masahara
D329,301 to Leonard
D381,135 to Hochlan
D389,267 to Sutton
D419,961 to Weatherill
D449,525 to Sturgess
D451,684 to Vincent
D466,804 to Solland
D472,009 to Eisenberg
D507,307 to Austin
D518,587 to Rodriguez
D539,971 to McDowell
D543,450 to Watzig
D551,969 to Aurilio
D556,361 to Arbel
D600,547 to Cain
RE30,103 to Spector
U.S. Pat. No. 1,106,135 to Dawes
U.S. Pat. No. 2,271,836 to Francis
U.S. Pat. No. 2,286,247 to Yearta
U.S. Pat. No. 2,339,385 to Dupler
U.S. Pat. No. 2,871,343 to Whitney
U.S. Pat. No. 3,336,474 to Daniel
U.S. Pat. No. 3,379,872 to Devine
U.S. Pat. No. 3,593,020 to Donato
U.S. Pat. No. 3,610,918 to Barlow
U.S. Pat. No. 3,937,948 to Allison
U.S. Pat. No. 4,121,279 to Whitesel
U.S. Pat. No. 4,139,955 to Reiback
U.S. Pat. No. 4,420,798 to Herst
U.S. Pat. No. 4,553,680 to Griggs
U.S. Pat. No. 4,754,380 to Wang
U.S. Pat. No. 5,262,929 to Lenhart
U.S. Pat. No. 5,297,012 to Fletcher
U.S. Pat. No. 5,676,446 to Gold
U.S. Pat. No. 5,788,579 to Cherry
U.S. Pat. No. 6,644,834 to Christen
2002/0085392 to Hajianpour
2004/0094437 to Dailey

SUMMARY

An article made of one-way glass is disclosed. The reflective surface of the one-way glass faces inwardly of the article. The one-way glass article is free of internal or external ornamentation or opaque elements. The one-way glass article is also free of internal lighting and instead is illuminated by external light sources reflected within the article by the reflective surface.

The one-way glass article is different from the prior art designs. For example, both Dupler and Barlow, which are representative of the art, are lit from an internal lamp or lamps. Internal lighting as well as internal lamps represent significant differences from the one-way glass article, which relies on external light source alone, reflected within the article (because of the one-way glass reflective surface), to illuminate the article. Further, Dupler and Barlow both have opaque elements internal to their objects. In Dupler, the sleeve with its ornamentation (tapered, ribs, annular portion) and the internal lamp are opaque elements internal to the globe. In Barlow, the miniature light bulbs, support wires, electrical wires and electrical connector are all opaque elements internal to the cube. The one-way glass article is free of any internal opaque elements. Moreover, Dupler has an opaque flange attached to the external surface to the globe.

Barlow has opaque support ribs attached to the external surface of the cube. There are no opaque elements in the one-way glass article and nothing attached externally to the article.

BRIEF DESCRIPTION OF THE DRAWINGS

FIG. 3 is a cross-sectional view of the spherical embodiment of the one-way glass article of FIG. 1.

FIG. 4 is a cross-sectional view of the cube embodiment of the one-way glass article of FIG. 3.

DETAILED DESCRIPTION OF THE INVENTION

Figure 1:
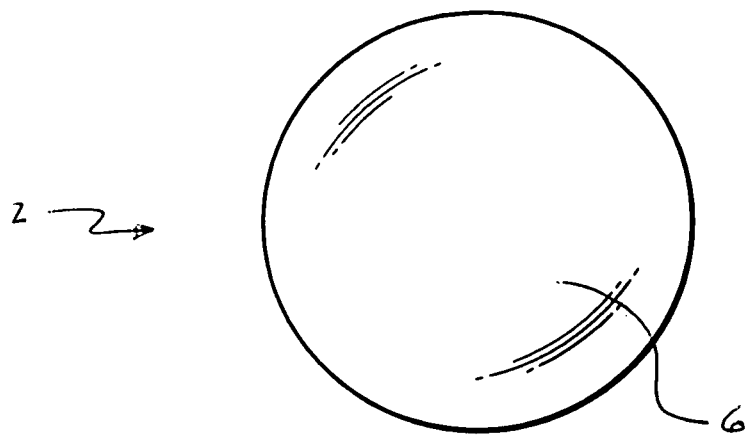
FIG. 1 is a front view of a spherical embodiment of a one-way glass article.

Referring to the drawings, representative embodiments of the one-way glass article are shown in FIGS. 1-4. FIGS. 1 and 3 depict a spherical embodiment of the one-way glass article generally indicated at 2. As shown in FIGS. 1 and 3, the spherical embodiment of the one-way glass article 2 has a spherical skin 6 and a hollow center 4. As shown in FIG. 3, the spherical embodiment of the one-way glass article 2 is circular in cross-section with the hollow center generally indicated at 4. The skin 6 of the spherical embodiment of the one-way glass article is made of a transparent material such as glass. An inner film 8 on the skin 6 of the one-way glass article is a reflective surface. The reflective side of the reflective surface faces inwardly toward hollow portion 4 of the spherical article 2.

Figure 2:
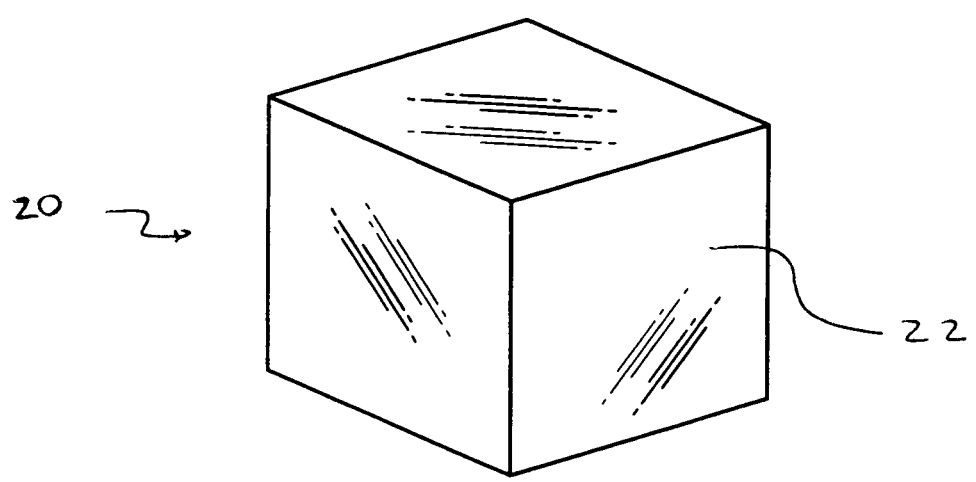
FIG. 2 is a perspective view of a cube embodiment of a one-way glass article.

FIGS. 2 and 4 depict a cube embodiment of a one-way glass article generally indicated at 20. As shown in FIGS. 2 and 4, the cube embodiment of the one-way glass article 20 has six sides, one of which is designated at 22. As shown in FIG. 4, the cube embodiment of the one-way glass article 20 is square in cross section having a hollow center generally indicated at 24. The skin 26 of the cube embodiment of the one-way glass article 20 is made of transparent material such as glass. An inner film 28 on the skin 26 of the one-way glass article is a reflective surface. The reflective side of the reflective surface faces inwardly toward hollow portion 24 of the spherical article 20.

One-way glass as used in this patent refers to a transparent material, such as glass, having a reflective or mirrored surface facing one side. From the opposite side, the material is transparent. The transparent material forming the one-way glass article can be tinted various colors.

In FIGS. 3 and 4, one-way glass is shown as a skin 6 and 26 with a reflective surface formed as a film coating 8 and 28 on the interior of the article with the reflective surface facing inwardly. The article can also be made from (1) a one-way glass reflective material that is an integral piece of material and does not require a film coating on the skin, (2) one-way glass that uses a surface coating on the exterior of the article with the reflective surface facing inwardly and a transparent skin on the inside of the article, (3) a skin and a coating having a differential index of reflection to create one-way glass, or (4) equivalent structures as would be understood by a person of ordinary skill in the art.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalents apparatus and articles. For example, while spherical and cube embodiments are depicted, the one-way glass article can be formed in various shapes. Also, the one-way glass article can be formed as a continuous piece of one-way glass material that has a hollow center or from pieces of one-way glass attached together to form an article with a hollow center.

The invention claimed is:

1. An article comprising:
    a skin of one-way glass having interior and exterior surfaces;
    the interior surface of the skin of one-way glass fully enclosing a hollow portion;
    the one-way glass having a reflective surface on the interior surface of the skin and facing inwardly toward the hollow portion; and
    the hollow portion being without opaque elements.
2. The article of claim 1, wherein the skin is spherical.
3. The article of claim 1, wherein the skin has six planar sides forming a cube.
4. The article of claim 1, wherein the article is free of opaque elements attached to the exterior surface of the skin.
5. The article of claim 1, wherein the article is free of an internal lighting source.
6. The article of claim 5, wherein the article is illuminated by light originating external to the article, entering the article and being reflected within the article by the one-way glass reflective surface.
7. The article of claim 1, wherein the article is made of glass.
8. The article of claim 1, wherein the skin is continuous.
9. The article of claim 7, wherein the skin is continuous.

* * * * *